(12) United States Patent
Chaudhuri et al.

(10) Patent No.: US 8,738,680 B2
(45) Date of Patent: May 27, 2014

(54) REUSE ENGINE WITH TASK LIST FOR FAST FOURIER TRANSFORM AND METHOD OF USING THE SAME

(75) Inventors: Arunava Chaudhuri, San Diego, CA (US); Hemanth Sampath, San Diego, CA (US); Iwen Yao, San Diego, CA (US); Jeremy H. Lin, San Diego, CA (US); Raghu N. Challa, San Diego, CA (US); Min Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 755 days.

(21) Appl. No.: 12/411,728

(22) Filed: Mar. 26, 2009

(65) Prior Publication Data
US 2009/0248774 A1    Oct. 1, 2009

Related U.S. Application Data

(60) Provisional application No. 61/040,331, filed on Mar. 28, 2008.

(51) Int. Cl.
*G06F 17/14* (2006.01)

(52) U.S. Cl.
USPC ............ 708/404; 708/403; 708/405; 708/406

(58) Field of Classification Search
None
See application file for complete search history.

(56) References Cited

U.S. PATENT DOCUMENTS

| | | | |
|---|---|---|---|
| 6,724,331 B1 | 4/2004 | El-Ghoroury et al. | |
| 6,775,331 B1 * | 8/2004 | Shinde | 375/297 |
| 2003/0009502 A1 * | 1/2003 | Katayanagi | 708/622 |
| 2003/0050945 A1 * | 3/2003 | Chen et al. | 708/404 |
| 2005/0222790 A1 * | 10/2005 | Simanapalli et al. | 702/80 |
| 2006/0083160 A1 | 4/2006 | Koo et al. | |
| 2006/0248135 A1 * | 11/2006 | Cousineau et al. | 708/404 |
| 2007/0239815 A1 | 10/2007 | Cousineau et al. | |
| 2008/0045158 A1 * | 2/2008 | Ji | 455/67.11 |

FOREIGN PATENT DOCUMENTS

| | | |
|---|---|---|
| CN | 1531690 A | 9/2004 |
| CN | 1798123 A | 7/2006 |
| CN | 1914607 | 2/2007 |
| JP | 2001196981 A | 7/2001 |
| JP | 2003016051 A | 1/2003 |
| JP | 2005525725 | 8/2005 |
| JP | 2006115520 A | 4/2006 |
| TW | I271049 B | 1/2007 |
| TW | I281619 B | 5/2007 |
| WO | 03063538 A1 | 7/2003 |
| WO | WO2009120640 | 10/2009 |
| WO | WO2009120644 | 10/2009 |

OTHER PUBLICATIONS

Lee et al, "64-bit and Multimedia Extensions in the PA-RISC 2.0 Architecture" IEEE 1996.*
Lee, Ruby B. "Precision Architecture", IEEE, 1989.*
International Search Report and Written Opinion—PCT/US2009/038473, International Search Authority—European Patent Office—Nov. 29, 2010.
Taiwan Search Report—TW098110228—TIPO—Oct. 29, 2012.

* cited by examiner

*Primary Examiner* — Li B Zhen
*Assistant Examiner* — Viva Miller
(74) *Attorney, Agent, or Firm* — Abdollah Katbab

(57) ABSTRACT

An improved processing engine for performing Fourier transforms includes an instruction processor configured to process sequential instruction software commands and a Fourier transform engine coupled to the instruction processor. The Fourier transform engine is configured to perform Fourier transforms on a serial stream of data. The Fourier transform engine is configured to receive configuration information and operational data from the instruction processor via a set of software tasks.

37 Claims, 11 Drawing Sheets

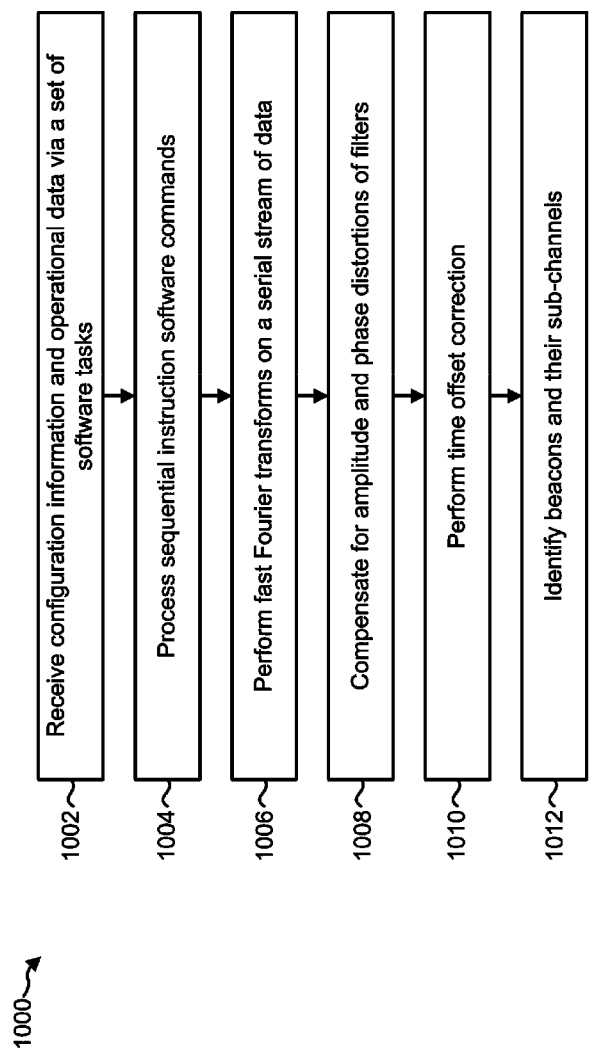

REUSE ENGINE WITH TASK LIST FOR FAST FOURIER TRANSFORM AND METHOD OF USING THE SAME

RELATED APPLICATION

This patent application claims priority to and benefit of U.S. Provisional Patent Application Ser. No. 61/040,331, filed Mar. 28, 2008, for "Reuse Engine With Task List For Fast Fourier Transform And Method Of Using The Same," with inventors Arunava Chaudhuri, Hemanth Sampath, Iwen Yao, Jeremy Lin, and Raghu Challa, which is incorporated herein by reference.

TECHNICAL FIELD

The present disclosure relates generally to wireless communication systems. More specifically, the present disclosure relates to a processing engine for performing Fourier transforms, which may be utilized in wireless communication systems.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

BRIEF DESCRIPTION OF THE DRAWINGS

FIG. 10 illustrates a method for a processing a received signal in accordance with the present disclosure.

DETAILED DESCRIPTION

Figure 1:
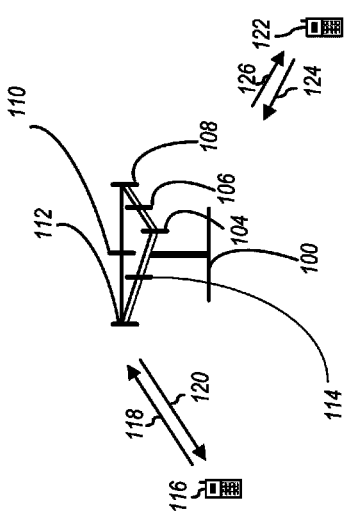
FIG. 1 illustrates a multiple access wireless communication system according to one embodiment.

An improved processing engine for performing Fourier transforms is disclosed. The processing engine includes an instruction processor configured to process sequential instruction software commands. The processing engine also includes a Fourier transform engine coupled to the instruction processor. The Fourier transform engine is configured to perform Fourier transforms on a serial stream of data. The Fourier transform engine is configured to receive configuration information and operational data from the instruction processor via a set of software tasks.

The configuration information may include at least one of FFT length, number of FFT butterfly stages and scaling information at each FFT butterfly stage. The operational data may include at least one variable selected from the group consisting of: the number of data symbols to skip before or between implementations, FFT length, the number of FFT stages to be executed, scaling for each FFT stage to be executed, a start time for each FFT operation to be executed, and a bit for instant start.

The operational data may include at least one of instructions for reading or supplying a sample start address, instructions for skipping a number of data symbols before or between implementations, instructions for executing multiple FFT stages, instructions for executing scaling at each FFT stage, instructions for starting an FFT operation, and instructions for performing an instant start.

The processing engine may also include a beacon sorter that identifies beacons and their sub-channels. The processing engine may also include a filter correction block that compensates for amplitude and phase distortions of filters. The processing engine may also include a phase ramp that performs time offset correction.

The operational data may include configuration information that indicates whether the Fourier transform engine should interrupt or not interrupt the instruction processor when the Fourier transform engine has completed the operation of performing Fourier transforms.

An apparatus operable in wireless communication system is also disclosed. The apparatus includes means for processing sequential instruction software commands. The apparatus also includes means for performing Fourier transforms on a serial stream of data. The means for performing Fourier transforms is configured to receive configuration information and operational data from the means for processing sequential instruction software commands via a set of software tasks.

A method used in wireless communication system is also disclosed. The method includes receiving configuration information and operational data via a set of software tasks. The method also includes processing sequential instruction software commands. The method also includes performing Fourier transforms on a serial stream of data.

A machine-readable medium comprising instructions that, when executed by a machine, cause the machine to perform certain operations is also disclosed. The operations performed by the machine include receiving configuration information and operational data via a set of software tasks. The operations performed by the machine also include processing sequential instruction software commands. The operations performed by the machine also include performing Fourier transforms on a serial stream of data.

An apparatus operable in a wireless communication system is also disclosed. The apparatus includes a processor that is configured to receive configuration information and operational data via a set of software tasks. The processor is also configured to process sequential instruction software commands. The processor is also configured to perform Fourier transforms on a serial stream of data. The apparatus also includes a memory coupled to the processor for storing data.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a multiple access technique. SC-FDMA has similar performance and essentially the same overall complexity as an OFDMA system. An SC-FDMA signal has a lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one embodiment is illustrated. A access point 100 (AP) includes multiple antenna groups, one including antenna 104 and antenna 106, another including antenna 108 and antenna 110, and an additional including antenna 112 and antenna 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. Antenna groups may be designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a base station, a Node B or some other terminology. An access terminal may also be called a mobile station, a mobile terminal, user equipment (UE), a wireless communication device, a terminal, or some other terminology.

Figure 2:
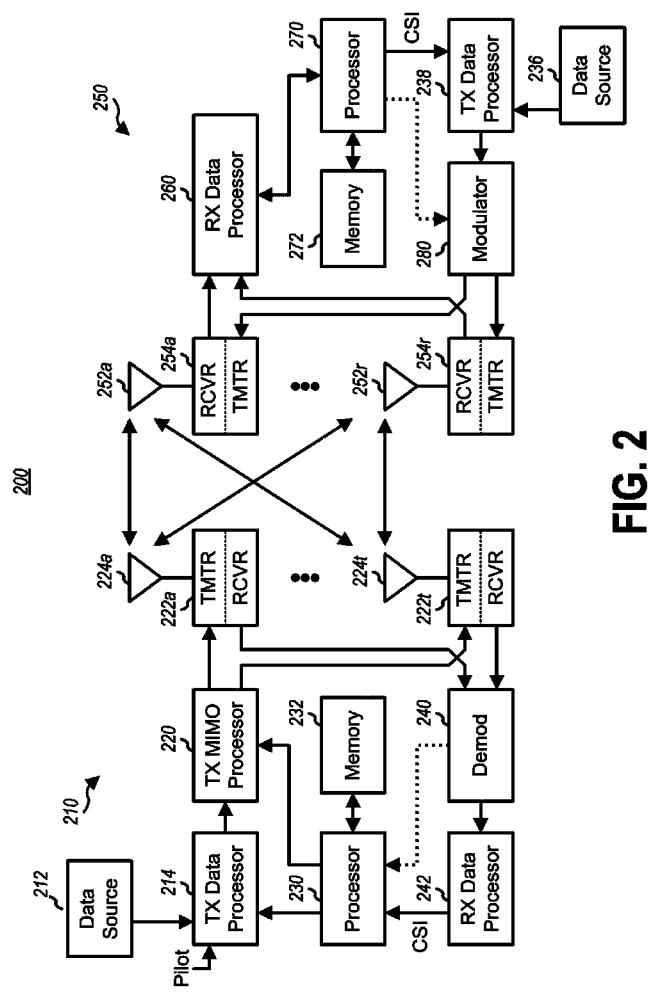
FIG. 2 illustrates a block diagram of a communication system.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 determines which pre-coding matrix to use for determining the beamforming weights, and then processes the extracted message.

Figure 3:
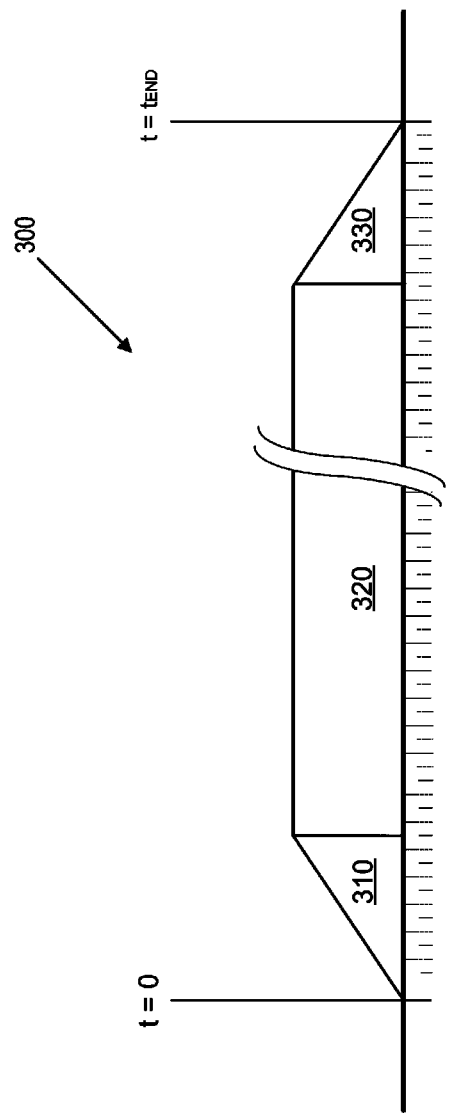
FIG. 3 illustrates a sample window of transmitted data according to one embodiment.

FIG. 3 shows a sample window 300 of data transmitted according to the present disclosure. At time t=0, sampling of window 300 begins. Note that window 300 includes three separate portions including a leading ramp 310, actual data 320, and trailing ramp 330. The transmission is completed at time $t=t_{END}$. This is merely an example of data transmission according to the present disclosure, and other methods of transmission may be used. Although the presently disclosed payload data is an OFDM block having a plurality of subcarriers, this is not formally necessary for transmission, and other methods may be used according to the present disclosure.

Figure 4:
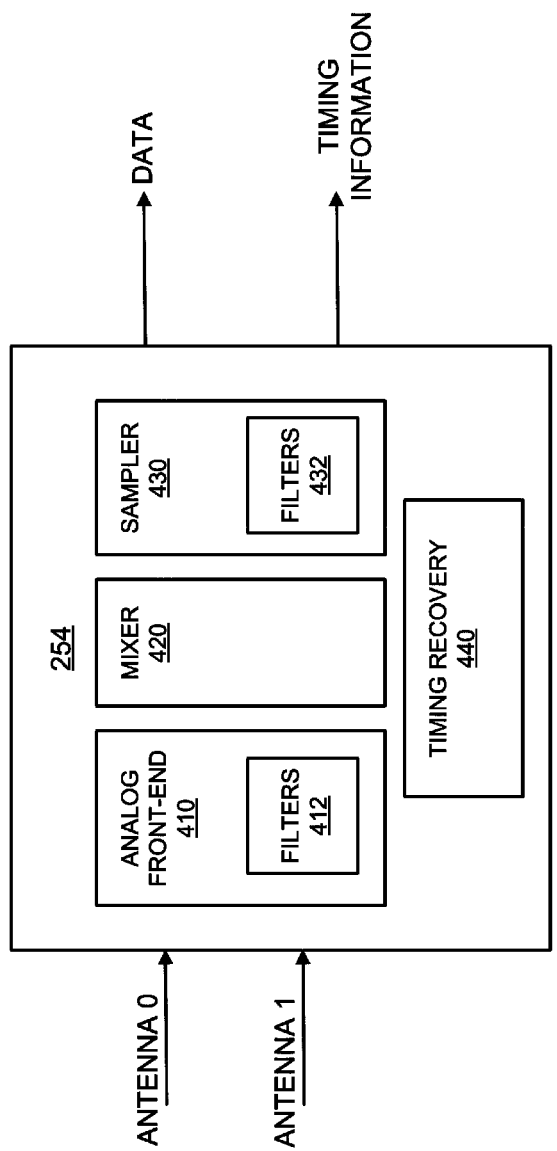
FIG. 4 illustrates a block diagram of a receiver according to one embodiment.

Continuing to FIG. 4, details of a receiver 254 of FIG. 2 are shown. As shown in FIG. 2, the receiver 254a receives signals from an antenna 252a, while the receiver 254r receives signals from antenna 252r. The following description can apply to both receiver 254a and receiver 254r.

While some details of the architecture of the receiver 254 are not shown, it should be appreciated that any known or later-developed architecture may be used as is well known to those of ordinary skill in the art. For example, in various embodiments, the various components 410-440 can take the form of separate electronic components coupled together via a series of separate busses. Still further, in other embodiments, one or more of the various components 410-440 can take form of processors or even separate servers coupled together via one or more networks. Additionally, it should be appreciated that each of components 410-440 advantageously can be realized using multiple computing devices employed in a cooperative fashion. It also should be appreciated that some of the above-listed components 410-440 can take the form of software/firmware structures and routines residing in a memory to be executed or worked upon by a controller, or even software/firmware routines or structures residing in separate memories in separate servers/computers being operated upon by different controllers.

In operation, as signals are received by antenna 0 and/or antenna 1 (and/or any other antenna) the analog front-end 410 can accept the received signals, condition the signals, such as through the use of filters 412 in analog front-end 410, and provide the conditioned signals to the mixer 420.

Among other operations, mixer 420 can down-convert the conditioned signals from their received frequency spectrum to a lower baseband spectrum. The baseband signal can then be provided to sampler 430, which can convert the analog baseband signal into digital data. Before or after sampling, filters 432 may be used to further filter the baseband signal. Filters 432 may be digital or analog.

Ideal filters would introduce no phase delay, would have a flat profile across all received frequencies, and would exhibit a perfect cutoff at any maximum or minimum frequency. However, known filters are understood to deviate from an ideal filter in multiple ways. Thus, in various embodiments, filters 412 and 432 may introduce distortion to the received signals. For example, one or both of filters 412 and 432 may introduce frequency dependent amplitude and phase distortions to a received signal, which could be detrimental to OFDM signals or other signals having a large frequency bandwidth. In some embodiments, filters 412 and 432 may introduce amplitude or phase distortions in the form of passband ripple. The nature of these distortions, and corrections for them, will be described below with reference to FIG. 5.

Independently, or in cooperation with any of analog front-end 410, mixer 420, and sampler 430, timing recovery device 440 may apply known algorithms to the received data to produce timing information. The timing recovery device 440 may receive analog data from the analog front end 410 or mixer, or may receive digital data from the sampler 430, or both, for use in its algorithms. However, as timing recovery is not expected to always be perfect, there may be an inadvertent time offset (expressed as $\tau_d$) present, which timing recovery device 440 may eventually recognize and report as will also be described below with reference to FIG. 5.

Figure 5:
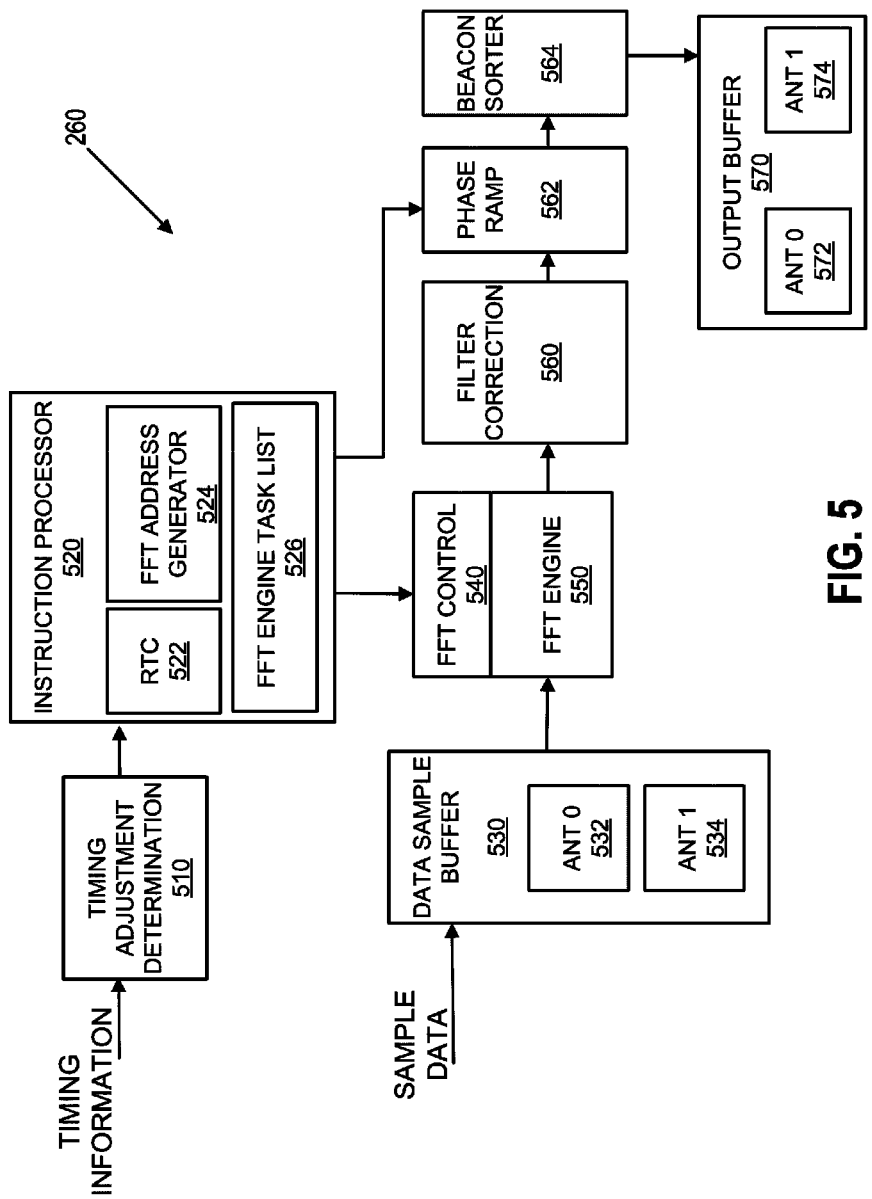
FIG. 5 illustrates a block diagram of the data processor according to one embodiment.

Continuing to FIG. 5, details of the data processor 260 of FIG. 2 are shown. As shown in FIG. 2, the data processor 260 can receive both timing information and sample data from receivers 254a and 254r.

While some details of the architecture of the data processor 260 are not shown, it should be appreciated that any known or later-developed architecture may be used as is well known to those of ordinary skill in the art. For example, in various embodiments, the various components 510-574 can take the form of separate electronic components coupled together via a series of separate busses. Still further, in other embodiments, one or more of the various components 510-574 can take form of processors or even separate servers coupled together via one or more networks. Additionally, it should be appreciated that each of components 510-574 advantageously can be realized using multiple computing devices employed in a cooperative fashion. It also should be appreciated that some of the above-listed components 510-574 can take the form of software/firmware structures and routines residing in a memory to be executed or worked upon by a controller, or even software/firmware routines or structures residing in separate memories in separate servers/computers being operated upon by different controllers.

As shown in FIG. 5, the exemplary data processor 260 includes a timing adjustment block 510 (which is typically software or firmware, but which may be hardware). The exemplary data processor 260 also includes an instruction processor block 520, i.e. a sequential instruction machine. The instruction processor block 520 is configured to process sequential instruction software (and/or firmware) commands. The instruction processor block 520 may be a digital signal processor (DSP).

The exemplary data processor 260 also includes an input data sample buffer 530, a Fast Fourier Transform (FFT) control device 540 and a corresponding FFT engine 550 (which is typically hardware), a filter correction block 560, a phase ramp 562, a beacon sorter 564, and an output buffer 570. The instruction processor block 520 further includes a real-time counter (RTC) 522, an FFT address generator 524, and an FFT engine task list 526.

In operation, timing information can be received by timing adjustment determination block 510, which can in turn provide an output time offset Id representing the uncorrected timing adjustment to instruction processor block 520. This time offset Id can be passed on to the phase ramp 562, as will be described below.

Meanwhile, data sample buffer 530 can receive sample data via one or more antennas 532, 534, within respective receivers 254a and 254r. In turn, data sample buffer 530 can provide buffered data samples to the FFT engine 550.

Continuing, FFT address generator 524 of processor block 520 can generate addresses that can be used by FFT engine 550. The control block 540 of FFT engine 550 can use the addresses generated by the FFT address generator 524 and the commands and variables stored in FFT engine task list 526 to control the FFT engine 550 in converting buffered data samples from which OFDM communication channels may be resolved.

According to the above architecture, any number of instructions, variables, and/or operational data may be held in the FFT Engine Task List 526 for use by the FFT control block 540. As non-limiting examples, the FFT Engine Task List 526 can include: variable(s) representing a sample start address; instructions for reading or supplying a sample start address; variable(s) representing the number of data symbols to skip before or between implementations; instructions for skipping a number of data symbols before or between implementations; variable(s) representing FFT Length; variable(s) representing the number of FFT stages to be executed; instructions for executing multiple FFT stages; variable(s) representing scaling for each FFT stage to be executed; instructions for executing scaling at each FFT stage; variable(s) representing a start time for each FFT operation to be executed; instructions for starting an FFT operation; variable(s) indicating a bit for instant start; or instructions for performing an instant start. In addition, the FFT Engine Task List 526 may also include configuration information (in the form of variable(s) and/or instruction(s)) that indicate whether the FFT engine 550 should interrupt or not interrupt the instruction processor 520 when the FFT engine 550 has completed the operation of performing Fourier transforms.

These are merely examples, and other instructions, variables, and/or data may be held in the FFT Engine Task List 526.

The contents of the FFT Engine Task List 526 can be held in firmware or memory, and can be updated and modified with new or different instructions, variables, and/or data as needed.

Note that the instructions, variables, and/or operational data held in the FFT Engine Task List 526 can be requested by the FFT control block 540 and stored in registers therein, or can be presented to the FFT control block 540 by the instruction processor 520 without request.

After the FFT engine 550 has converted the buffered data samples (which are of time-domain format) into a block of frequency-domain data, a total of k rows of OFDM data can be provided to the filter correction block 560. Each orthogonal frequency component will have a resolved value for its frequency $f_k$ and time t, as represented in Equation (1):

$$I+jQ=A \exp(-j\, 2\pi f_k t) \qquad \text{Equation (1)}$$

where A is an amplitude.

Note that in practical operation, the FFT data may require amplitude and/or phase corrections, as will be discussed below.

A mechanism for FFT engine 550 to accommodate a large frequency domain dynamic range of a received signal will now be described with reference to FIG. 6 and FIG. 7.

Figure 6:
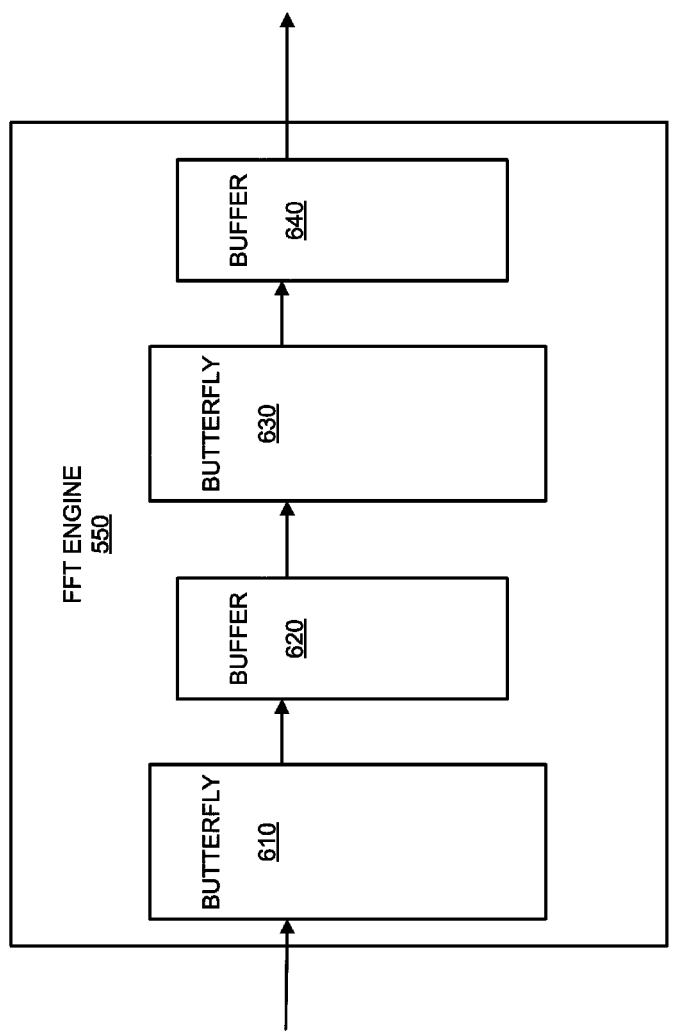
FIG. 6 illustrates aspects of an FFT engine according to one embodiment.
Figure 7:
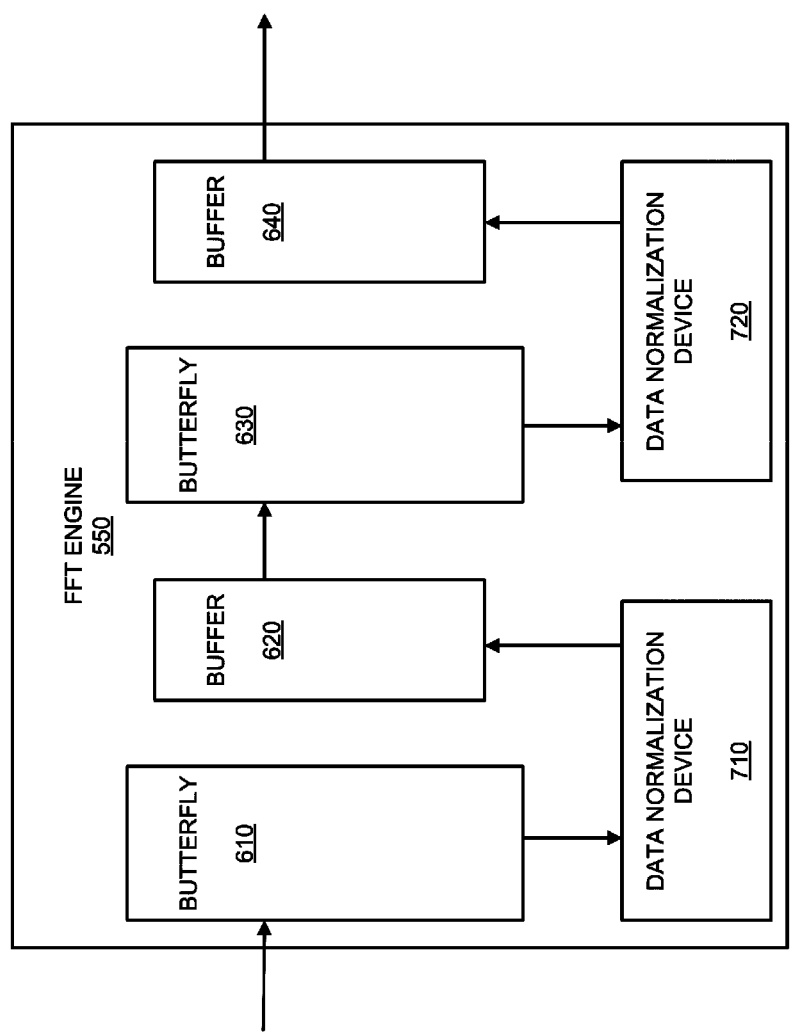
FIG. 7 illustrates further aspects of an FFT engine according to one embodiment.

Referring to FIG. 6, FFT engine 550 may have any number of internal FFT stages, identified as "butterflies." Each butterfly can be followed by a buffer. As illustrated, FFT engine 550 has two butterflies, butterfly 610 and butterfly 630, and each is followed by a buffer 620, 640. This is merely an example, and FFT engine 550 may contain more or fewer butterflies and buffers, such as (as non-limiting examples) four, eight, or sixteen butterflies and buffers.

Successive butterflies are used in successive stages of the FFT process. Thus, butterfly 610 is used in a first stage of the FFT, and its output is stored in buffer 620. The contents of buffer 620 are then taken up by butterfly 630 in a second stage of the FFT, and its output is stored in buffer 640.

Received symbols across the FFT sub-channels can have a large dynamic range, due to such factors as frequency domain channel variations, the power boost of particular sub-channels such as the beacons described below (which may in some embodiments be 30 dB stronger than other sub-channels), and the power boost of particular sub-channels such as FL control channel tones (which may range in some embodiments from 0 to 15 dB stronger than other sub-channels). If FFT engine 550 does not normalize this large dynamic range, FFT output can be saturated, leading to distortion of symbols adjacent to the saturated sub-channels and poor demodulation performance on such sub-channels. Further, if FFT engine 550 does not normalize this large dynamic range, the storage size of buffer 620 and buffer 640 will be large.

One method of data normalization will now be described with reference to FIG. 7. In FIG. 7, as in FIG. 6, butterfly 610 is used in a first stage of the FFT. In FIG. 7, however, the output of butterfly 610 is first sent to data normalization device 710, whose normalized output is stored in buffer 620. The contents of buffer 620 are then taken up by butterfly 630 in a second stage of the FFT. Again, the output of butterfly 630 is sent to data normalization device 720, whose normalized output is stored in buffer 640. Thus, the overall data dynamic range may be improved through normalization, requiring less storage space and reducing hardware and storage costs for buffering of data in the FFT engine while the amplitude ratios between various sub-channels are preserved.

Continuing, normalization can be accomplished according to the following four steps. First, a butterfly stage is executed, for example in butterfly 610. Then, the output data is normalized between the maximum and minimum amplitudes of the signal, for example in data normalization device 710. Next, this normalized data is stored in a buffer, for example buffer 620. Finally, the buffered, normalized data is sent to the next butterfly, for example butterfly 630, for the next FFT stage.

As a non-limiting example, normalization may be accomplished within the FFT engine 550 by way of digital gain control at each stage of FFT engine, or at the input and output of the FFT engine, or any combination thereof, where the resulting gains are stored. Such normalization lowers the FFT bitwidth, which can ultimately lead to FFT timeline improvement and FFT area reduction. Such normalization can also lead to a reduction of symbol buffer bit-widths and hence overall modem area reduction. Normalization can give area and timeline improvements, which can offset the cost needed to increase the design complexity of FFT engine 550 by adding data normalization devices 710 and 720.

The above normalization is only one way of addressing the potentially large dynamic range of a received signal. Another technique, which may be used together with the above normalization or in lieu thereof, is to increase the bit-width of FFT engine and symbol buffer output, relative to a sample-server, to accommodate large dynamic range of FFT output symbols. One embodiment uses an 11 bit sample-server and a 14 bit FFT and symbol buffer. Yet another technique, which may be used by a sample server together with the above techniques or in lieu thereof, is to increase a sample-server signal power backoff at low carrier-to-interface channel conditions, to trade-off quantization noise and additional headroom for post-FFT symbol power gain. All of these techniques can lead to a reduction in distortion, and hence performance improvement. Moreover, the latter technique can accommodate larger sub-channel power boosts at low carrier-to-interface scenarios without incurring an increase in FFT or symbol buffer bitwidth.

Returning to FIG. 4, as discussed above, filter 412 in the analog front-end 410 and filter 432 in the sampler 430 may introduce some amount of phase and amplitude distortion, which may cause notable degradation of performance in an OFDM system.

The composite amplitude distortion of the filters 412 and 432 for a given signal frequency can be represented by the value $A_{fk}$, and may be different for different frequency components. The equivalent time delay resulting in the composite phase distortion of filters 412 and 432 can be represented by the symbol $\tau_{efk}$, and may also vary as a function of frequency component. Thus, once converted to the frequency domain by the Fast Fourier Transform, the composite amplitude and phase distortion of the filters may then be represented by the following $$A_c = A_{fk} \exp(-j\, 2\pi f_k(\tau_{cfk})) \qquad \text{Equation (2)}$$

where $f_k$ can be any frequency sub-carrier in an OFDM signal. Note that the time delay resulting in the phase distortion is written as $\tau_{cfk}$ to represent that $\tau_c$ may vary for different orthogonal OFDM frequencies $f_k$. Similarly, the Amplitude distortion factor is written as $A_{fk}$ to represent that $A_{fk}$ may vary for different orthogonal OFDM frequencies $f_k$. The symbol j, under the common convention, represents the square root of −1.

The above architecture addresses these distortions through a post-FFT frequency domain compensation.

Making reference to FIG. 5, the frequency response of filters 412 and 432 is stored in a memory, which may be internal to the filter correction block 560 or external thereto. In various embodiments, this frequency response may be computed during manufacture of the device and stored in the filter correction block 560, or may be uploaded to the filter correction block 560 as firmware, or may be computed by the filter correction block 560 upon processing of an internally generated signal.

As the FFT engine 550 provides sample data in the frequency domain, the filter correction block 560 can multiply each frequency band of the post-FFT signal by parameter $A_c^{-1}$, which is the reciprocal of the stored filter response(s), to obtain a clean, corrected signal, as if processed by ideal filters. This will now be described in reference to FIG. 8.

Figure 8:
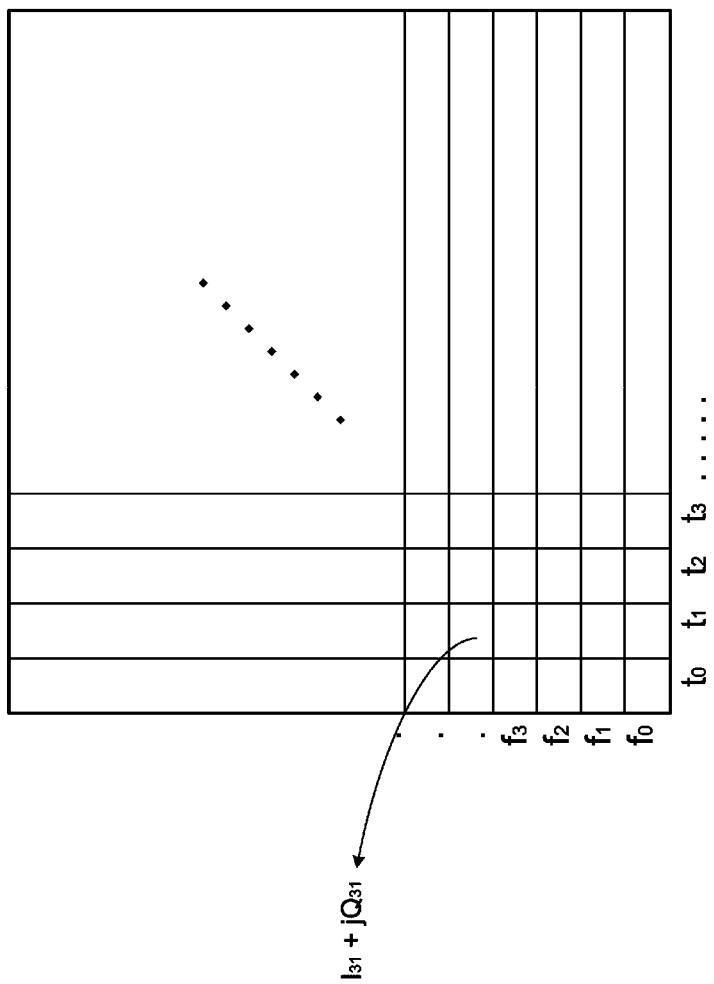
FIG. 8 illustrates a received digital signal divided into an array according to one embodiment.

FIG. 8 illustrates an example of an array in which the received digital signal may be divided into cells according to the FFT size and the sample rate, i.e. the number of OFDM sub-carriers and the number of samples in a period of time. Each cell of the array can be processed by filter correction block 560, and can effectively be multiplied by the reciprocal of Equation (2) to compensate for the known amplitude and phase distortions of filters 412 and 432. The value $\tau_{cfk}$ can be presumed to be constant for each round of signal data, but can in optional embodiments be recalculated for each OFDM symbol.

Returning to FIG. 5, after filter correction block 560 produces filter corrected data, this corrected data is provided to phase ramp 562 to address timing offsets, which in the frequency domain appears as a rotation of an FFT output value.

Thus, the phase ramp 562 can be configured to receive timing information such as a time offset via the instruction processor 520 for a given block of OFDM data. This timing offset information (expressed as $\tau_d$) can be determined for the input signal, and a respective phase correction coefficient can be calculated for each frequency in an OFDM block according to Equation (3)

$$D_k = \exp(-j\, 2\pi f_k(\tau_d)) \qquad \text{Equation (3)}$$

where $f_k$ can be any frequency sub-carrier in an OFDM signal.

The above architecture addresses time offset correction in the frequency domain through compensation at the phase ramp 562. When sample data arrives from data sample buffer 530, FFT engine 550 transforms the sample data into the frequency domain. Then, phase ramp 562 multiplies each frequency band of the post-FFT signal by $D_k^{-1}$, the reciprocal of the above phase correction coefficient, to effectively shift the signal in the time domain back to where it should have been had no delay occurred. The above procedure will be described with further reference to FIG. 8. In some embodiments it may be possible to combine the filter correction block 560 and the phase ramp 562, e.g., by combining equations (2) and (3).

As described above, FIG. 8 illustrates an example of an array in which the received digital signal may be divided into cells according to the FFT size and the sample rate, i.e. the number of OFDM sub-carriers and the number of samples in a period of time. In some embodiments, each cell of the array may be processed by the phase ramp 562 to correct for timing offsets. Each cell's value is multiplied by the reciprocal of Equation (3) to compensate for the known time delay $\tau_d$. The value $D_k$ can then be recomputed for each frequency $f_k$ upon receipt of the next block of OFDM data.

Returning to FIG. 5, the time-offset-corrected and filter-corrected sample output can then be provided to beacon sorter 564. In some embodiments, one or more of the frequency sub-carriers $f_k$ in the OFDM signal can be transmitted as a beacon signal. A beacon signal, also referred to as a "pilot signal," is a signal provided at a constant high amplitude for all or part of a transmission. The beacon signal may be used to calibrate the gain for one or more of the other sub-carriers, to increase or balance the gain of the multiplexed signal, or to identify proper spacing and resolution of the sub-channels. As a non-limiting example, if a 512 sub-channel transmission is used (that is, if 0<k<511), beacon signals may be evenly distributed across eight sub-channels $f_k$ at k=0, 63, 127, 191, 255, 319, 383, and 447 for the duration of a block of OFDM data. This is merely an example, and any number of beacon signals may be used. Also, in some embodiments, the same sub-channels may be used as beacons for a complete transmission, while in some embodiments, a given sub-channel may be used as a beacon for only a partial block of OFDM data.

Beacon sorter 564 can identify beacons and their sub-channels from among the k sub-channels of the transmission. In some embodiments, beacon sorter operates as follows.

Each sub-channel of frequency $f_k$ has a complex amplitude at time t which may be expressed as Equation (4):

$$I_{cfk}+jQ_{cfk}=(1/A_{fk})\exp(-j\,2\pi f_k(t-(\tau_{cfk}+\tau_d))) \quad \text{Equation (4)}$$

where the subscript "cfk" is used to designate that this amplitude has been corrected (for example, by filter correction block 560). The total energy of a sub-channel of frequency $f_k$ for a time t can be calculated according to Equation (5):

$$E_{cfk}=(I_{cfk})^2+(Q_{cfk})^2 \quad \text{Equation (5)}$$

The value $E_{cfk}$ may then be summed across a given frequency $f_k$, e.g. a "row" in FIG. 8, to determine a total energy for a sub-channel. Thus, beacon sorter 564 can, for each sub-channel k, determine the energy of each sub-channel, and then identify a subset of channels as beacons. In some embodiments, a predetermined number of beacons are identified as the highest-energy sub-channels. For example, in some embodiments the four channels with the highest energy may be presumed to be beacons. In other embodiments, the top eight channels with the highest energy may be presumed to be beacons.

Alternatively, a subset of the highest-energy sub-channels may be identified by the beacon sorter as beacons based on a set of stored rules. As an example, the beacon sorter may identify the energy difference between adjacent channels, and identify those channels with the largest energy differences from their neighbors as beacons. Other stored rules may be used.

In the case where two or more antennas are used, the value $E_{cfk}$ can be summed across antennas for each sub-channel.

Figure 9:
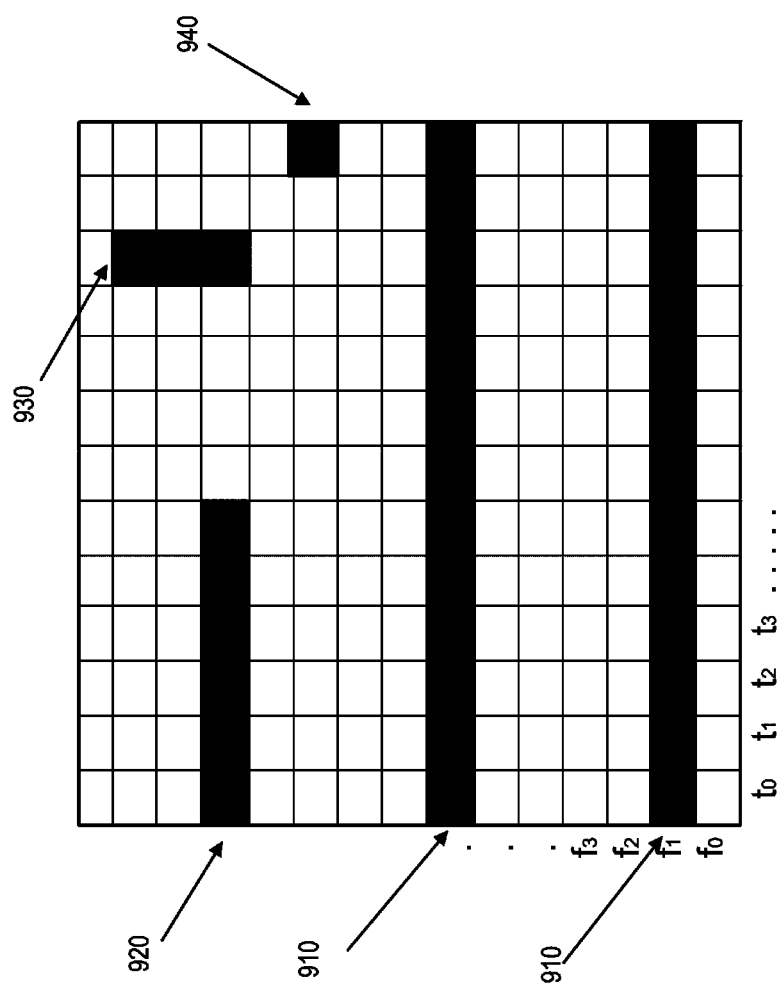
FIG. 9 illustrates a received digital signal containing beacons according to one embodiment.

Making reference to FIG. 9, note again that one or more frequencies $f_k$ (each shown as a row) may be reserved entirely for beacons 910, or may only be used as a beacon for a limited time 920. Alternatively, beacons may be sent on multiple frequencies but only for a fixed time t, shown as beacon 930. Still alternatively, single frequencies and times may be used as beacons 940. Any of these beacons may be resolved by the beacon sorter 564.

Returning to FIG. 5, beacon sorter 564 can report a sub-channel index, a sub-channel strength, a beacon time window, or any combination thereof. Thus, output buffer 570 receives one or more identifications of beacon frequencies and/or times from beacon sorter 564, along with the time-offset-corrected and filter-corrected sample output.

Thus, the present FFT architecture provides a number of heretofore unachieved advantages. The following are non-limiting examples.

(1) Post-FFT frequency domain compensation allows for relaxed tolerance requirements for filters 412 and 432, particularly in regards to passband distortion/ripple tolerance requirements. Using post-FFT compensation, less expensive analog and/or digital filters may thus be used.

(2) Further, using post-FFT compensation, digital filters like Finite Impulse Response filters would use a smaller number of taps, allowing for easier implementation requiring a smaller number of multipliers, and ultimately leading to power/area savings.

(3) Using post-FFT timing correction allows for cleaner and more accurate signal output.

(4) Handling of multiple cyclic prefixes and/or multiple FFT bandwidths may be enabled in a OFDMA-modem through efficient firmware (FW) control of a hardware (HW) FFT block, such as FFT control block 540 using FFT engine task list 526 to control FFT engine 550.

(5) Multiple antennas in a MIMO-OFDMA modem, such as antennas 532 and 534, may be attended to a single HW FFT block under efficient FW control. In the present architecture, a single HW FFT block, like FFT engine 550, is clocked faster to perform FFTs of multiple antennas. The FW can control whether to perform FFT of signals from one antenna or from both antennas, such as through the use of instructions and variables in the FFT engine task list 526.

(6) Timing adjustments (resulting from a FW time-tracking loop) may be corrected through efficient FW control of an HW FFT-Sample Server block. In the present architecture, FW adjustment of FFT Sample-server starting addresses is achieved via a task list, like FFT engine task list 526. Under some circumstances, it may be desirable to defer the application of timing adjustments because there may be only certain points (e.g., the end of a frame) where it is allowable to change the system timing. With the methods disclosed herein, application of timing adjustments can be deferred, because there is a mechanism to compensate for known timing errors.

(7) An FFT block may be efficiently reused to handle different modes of operation, such as, as non-limiting examples, a connected state demodulation mode and an initial acquisition mode. Connected state demodulation uses the FFT block to ignore the samples corresponding to cyclic prefix, while an initial acquisition block instead uses the FFT block to attend to these cyclic prefix samples. The FFT block may be reused through the use of instructions and variables in a task list, like FFT engine task list 526. These instructions can include a sample-server starting address for the FFT block.

The timing offset can be used to perform FFTs on multiple base stations without committing the synchronization of the timing to each before performing the FFT. For example, if a device is communicating with multiple base stations, with the methods disclosed herein it is not necessary to repeatedly synchronize the timing with different base stations (e.g., synchronizing with a first base station, then synchronizing with a second base station, then re-synchronizing with the first base station, and so forth). Rather, with the methods disclosed herein, the timing can be synchronized with just one of the base stations. Then, without changing the timing, it is possible to correct a known timing delay from another base station via the phase ramp.

(8) FW control of exact timing of FFT engine may be achieved based upon a Real Time Counter, like counter 522. Such a HW Real Time Counter can track a sample-count of post ADC samples, in accordance with instructions and variables in a task list, like FFT engine task list 526.

(9) FW control of scaling factors and gains may be achieved for each stage of FFT. Again, different stages can be processed with different scaling factors and gains based on the use of instructions and variables in a task list, like FFT engine task list 526.

(10) HW area and power consumption can be reduced through the use of the present architecture, where a single FFT engine 550 applies multiple transforms under multiple conditions to signals from multiple antennas.

(11) FFT sample size may be reprogrammed to any size, including (but not limited to) 256, 512, 1024, 2048, and 4096.

(12) FW control of multiple butterfly stages of the FFT with a low bitwidth.

FIG. 10 illustrates a method 1000 for processing a received signal in accordance with the present disclosure. The method 1000 may be implemented by the data processor 260 of FIG. 6.

Configuration information and operational data may be received 1002 via a set of software tasks (e.g., the tasks in the FFT engine task list 526). The configuration information may include FFT length, the number of FFT butterfly stages and scaling information at each FFT butterfly stage etc. The operational data may include the number of data symbols to skip before or between implementations, the FFT length, the number of FFT stages to be executed, the scaling for each FFT stage to be executed, a start time for each FFT operation to be executed, a bit for instant start, etc.

Sequential instruction software commands may be processed 1004. For example, the configuration information and operational data stored in the FFT engine task list 526 may be used to control the FFT engine 550 in performing 1006 fast Fourier transforms on a serial stream of data.

After the FFT engine 550 has converted the data into frequency-domain data, compensation for amplitude and phase distortions of filters 412, 432 may be performed 1008 by a filter correction block 560. For example, as the FFT engine 550 provides sample data in the frequency domain, the filter correction block 560 can multiply each frequency band of the post-FFT signal by parameter $A_c^{-1}$, which is the reciprocal of the stored filter response(s), to obtain a clean, corrected signal, as if processed by ideal filters.

In addition, time offset correction may also be performed 1010. For example, a phase ramp 562 can be configured to receive timing information such as a time offset via the instruction processor 520 for a given block of OFDM data. This timing offset information can be determined for the input signal, and a respective phase correction coefficient can be calculated for each frequency in an OFDM block (e.g., according to Equation (3) above).

Also, beacons and their sub-channels may be identified 1012. For example, a beacon sorter 564 can identify beacons and their sub-channels from among the k sub-channels of the transmission.

Figure 10A:
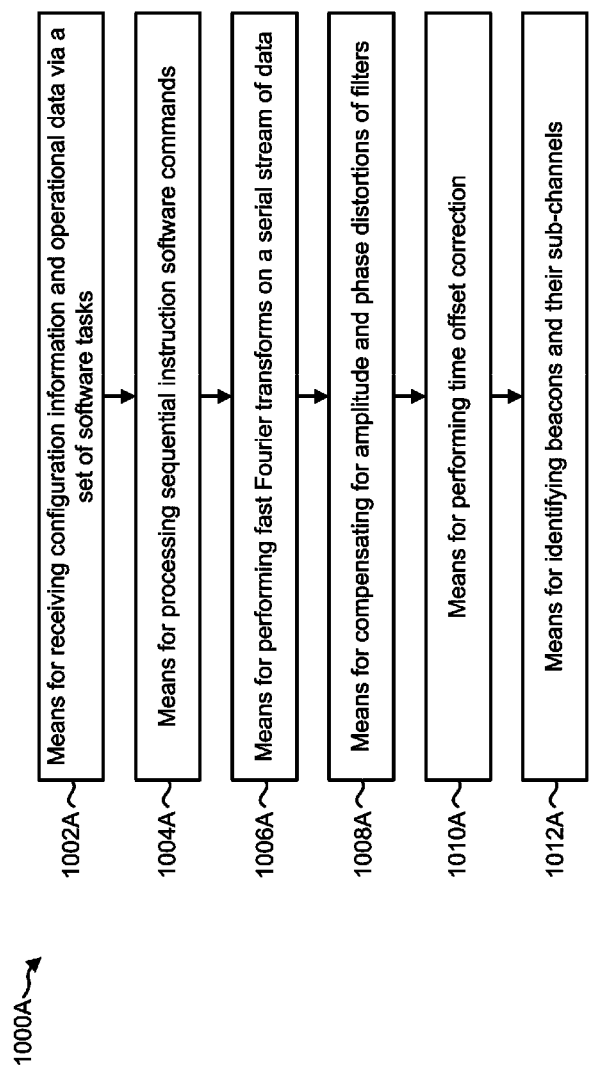
FIG. 10A illustrates means-plus-function blocks corresponding to the method of FIG. 10.

The method 1000 of FIG. 10 described above may be performed by various hardware and/or software component(s) and/or module(s) corresponding to the means-plus-function blocks 1000A illustrated in FIG. 10A. In other words, blocks 1002 through 1012 illustrated in FIG. 10 correspond to means-plus-function blocks 1002A through 1012A illustrated in FIG. 10A.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The functions described herein may be implemented in hardware, software, firmware, or any combination thereof If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An improved processing engine for performing Fourier transforms, comprising:
    an instruction processor that processes sequential instruction software commands, wherein the instruction processor comprises a fast Fourier transform (FFT) address generator for generating start addresses of sampled serial data and wherein the instruction processor comprises an FFT task list that maintain instructions, variables, and operational data, and configuration data that is sent to a Fourier transform controller to control the implementation of a Fourier transform engine in converting and processing the buffered samples of a serial stream of data wherein the operation data is information used to acquire, scale and process the sample data and configuration data is information used to configure the Fourier transform engine to process the serial data; and
    the Fourier transform engine coupled to the instruction processor through the Fourier transform controller, for performing Fourier transforms on the serial stream of data, wherein the Fourier transform engine comprises a plurality of FFT stages, the Fourier transform engine performing Fourier transforms on a serial stream of data; and
    wherein the Fourier transform engine receives the addresses and the FFT task list from the instruction processor and configures a number of FFT stages of the Fourier transform engine based on the configuration data and converts the samples identified from the addresses as indicated by the operational data to thereby process the serial stream of data.

2. The processing engine of claim 1, wherein the instructions, variables, and operational data includes at least one of FFT length, a number of FFT butterfly stages to be executed and scaling information at each FFT butterfly stage.

3. The processing engine of claim 1, wherein the instructions, variables, and operational data includes at least one of an OFDM sample start address from an OFDM sample memory, a number of symbols to skip, a start time of FFT operation or an instant start command.

4. The processing engine of claim 1, wherein the instructions, variables, and operational data includes at least one variable selected from the group consisting of: a number of data symbols to skip before or between implementations, FFT length, a number of the plurality of FFT stages to be executed, scaling for each FFT stage to be executed, a start time for each FFT operation to be executed, and a bit for instant start.

5. The processing engine of claim 1, wherein the instructions, variables, and operational data includes at least one of instructions for reading or supplying a sample start address, instructions for skipping a number of data symbols before or between implementations, instructions for executing multiple FFT stages, instructions for executing scaling at each FFT stage, instructions for starting an FFT operation, and instructions for performing an instant start.

6. The processing engine of claim 1, further comprising a beacon sorter that identifies beacons and their sub-channels.

7. The processing engine of claim 1, further comprising a filter correction block that compensates for amplitude and phase distortions of filters.

8. The processing engine of claim 7, further comprising a phase ramp that is communicatively coupled to the instruction processor and that performs time offset correction on an output of the filter correction block using a time offset provided by the instruction processor.

9. The processing engine of claim 1, wherein the instruction processor comprises a digital signal processor and the Fourier transform engine comprises a hardware FFT engine, and wherein the instructions, variables, and operational data comprises information that indicates whether the Fourier transform engine should interrupt or not interrupt the instruction processor when the Fourier transform engine has completed the operation of performing Fourier transforms.

10. An apparatus operable in wireless communication system, the apparatus comprising:
    means for processing sequential instruction software commands, wherein the means for processing comprises an element for generating start addresses of sampled serial data and wherein the means for processing comprises a fast Fourier transform (FFT) task list that maintains instructions, variables, and operation data, and configuration data that is sent to a Fourier transform controller to control the implementation of a transforming means in converting and processing the buffered samples of a serial stream of data wherein the operation data is information used to acquire, scale, and process the same data and configuration data is information used to configure the engine to process the serial data; and
    the transforming means coupled to the means for processing through the Fourier transform controller, for performing Fourier transforms on a serial stream of data, wherein the transforming means comprises a plurality of FFT stages, the transforming means performing Fourier transforms on the serial stream of data; and receives the addresses and the FFT task list from the means for processing and configures a number of FFT stages of the transforming means based on the configuration data and converts the samples identified from the addresses as indicated by the operational data to thereby process the serial stream of data.

11. The apparatus of claim 10, wherein the instructions, variables, and configuration data include at least one of FFT length, number of FFT butterfly stages to be executed and scaling information at each FFT butterfly stage.

12. The apparatus of claim 10, wherein the instructions, variables, and operational data includes at least one of an OFDM sample start address from an OFDM sample memory, a number of symbols to skip, a start time of FFT operation or an instant start command.

13. The apparatus of claim 10, wherein the instructions, variables, and operational data includes at least one variable selected from the group consisting of: a number of data symbols to skip before or between implementations, FFT length, a number of the plurality of FFT stages to be executed, scaling for each FFT stage to be executed, a start time for each FFT operation to be executed, and a bit for instant start.

14. The apparatus of claim 10, wherein the instructions, variables, and operational data includes at least one of instructions for reading or supplying a sample start address, instructions for skipping a number of data symbols before or between implementations, instructions for executing multiple FFT stages, instructions for executing scaling at each FFT stage, instructions for starting an FFT operation, and instructions for performing an instant start.

15. The apparatus of claim 10, further comprising means for identifying beacons and their sub-channels.

16. The apparatus of claim 10, further comprising means for compensating for amplitude and phase distortions of filters.

17. The apparatus of claim 10, further comprising means for performing time offset correction communicatively coupled to the means for processing, wherein the time offset correction is performed on an output provided by the means for compensating for amplitude and phase distortions of filters using a time offset received from the means for processing sequential instruction software commands.

18. The apparatus of claim 10, wherein the means for processing sequential instruction software commands comprises a digital signal processor and the means for performing Fourier transforms comprises a hardware FFT engine, wherein the instructions, variables, and operational data comprises information that indicates whether the means for performing Fourier transforms should interrupt or not interrupt the digital signal processor when the means for performing Fourier transforms has completed the operation of performing Fourier transforms.

19. A method used in a wireless communication system containing an instruction processor that processes sequential instruction software commands, wherein the instruction processor comprises a fast Fourier transform (FFT) address generator for generating start addresses of sampled serial data and an FFT task list that maintains instructions, variables, operational data, and configuration information; the instruction processor coupled to a Fourier transform controller to control the implementation of a Fourier transform engine comprising a plurality of FFT stages to perform Fourier transforms on a serial stream of data, the method comprising:
obtaining the variables, instructions, configuration information, and operational data and generate a set of software tasks to be maintained in the FFT task list by the instruction processor for configuring the Fourier transform engine;
generating start addresses of sampled serial data by the FFT address generator;
receiving and processing the set of software tasks and start addresses of the sampled serial data by the Fourier transform controller, to configure the implementation of the Fourier transform engine, wherein the configuring includes controlling operation of a plurality of FFT stages of the Fourier transform engine in accordance with the set of software tasks and based on an address generated by the FFT address generator associated with the instruction processor; and
performing Fourier transforms on the serial stream of data by the configured Fourier transform engine wherein the performing acquires, scales, and processes the sample data using the configured FFT stages.

20. The method of claim 19, wherein the configuration information includes at least one of FFT length, number of FFT butterfly stages to be executed and scaling information at each FFT butterfly stage.

21. The method of claim 19, wherein the operational data includes at least one of an OFDM sample start address from an OFDM sample memory, a number of symbols to skip, a start time of FFT operation or an instant start command.

22. The method of claim 19, wherein the operational data includes at least one variable selected from the group consisting of: a number of data symbols to skip before or between implementations, FFT length, a number of the plurality of FFT stages to be executed, scaling for each FFT stage to be executed, a start time for each FFT operation to be executed, and a bit for instant start.

23. The method of claim 19, wherein the operational data includes at least one of instructions for reading or supplying a sample start address, instructions for skipping a number of data symbols before or between implementations, instructions for executing multiple FFT stages, instructions for executing scaling at each FFT stage, instructions for starting an FFT operation, and instructions for performing an instant start.

24. The method of claim 19, further comprising identifying beacons and their sub-channels.

25. The method of claim 19, further comprising compensating for amplitude and phase distortions of filters.

26. The method of claim 19, further comprising performing time offset correction using an offset time received from the instruction processor.

27. The method of claim 19, wherein the instruction processor comprises a digital signal processor that performs the operation of processing sequential instruction software commands, wherein a the Fourier transform engine comprises a hardware FFT engine, and wherein the operational data comprises information that indicates whether the Fourier transform engine should interrupt or not interrupt the instruction processor when the Fourier transform engine has completed the operation of performing Fourier transforms.

28. An electronic device configured to execute the method of claim 19.

29. A computer program product, comprising:
a non-transitory computer-readable medium comprising:
code for causing a computer to perform Fourier transforms on serial data by
obtaining configuration information and operational data in a set of software tasks, wherein the computer contains an instruction processor that processes sequential instruction software commands, wherein the instruction processor comprises a fast Fourier transform (FFT) address generator for generating start addresses of sampled serial data and an FFT task list that maintains instruction, variables, operation data, and configuration information; the instruction processor coupled to a Fourier transform controller to control the implementation of a Fourier transform engine comprising a plurality of FFT stages to perform Fourier transform on a serial stream of data;
code for causing the computer to obtain variables, instructions, configuration information, and operational data and generate a set of software tasks to be maintained in the FFT task list by the instruction processor for configuring the Fourier transform engine;
code for causing the computer to generate start addresses of sampled serial data by the FFT address generator;
code or causing the computer to receive and process the set of software tasks and start addresses of the sampled serial data by the Fourier transform controller, to configure the implementation of the Fourier transform engine, wherein the configuring includes controlling operation the plurality of FFT stages of the Fourier transform engine in accordance with the set of software tasks and based on an address generated by the FFT address generator associated with the instruction processor; and
code for causing the computer to perform Fourier transform on the serial stream of data by the configured Fourier transform engine wherein the performing acquires, scales, and processes the sample data using the configured FFT stages.

30. The computer program product of claim 29, wherein the configuration information includes at least one of FFT length, number of FFT butterfly stages to be executed and scaling information at each FFT butterfly stage.

31. The computer program product of claim 29, wherein the operational data includes at least one of an OFDM sample start address from an OFDM sample memory, a number of symbols to skip, a start time of FFT operation or an instant start command.

32. The computer program product of claim 29, wherein the operational data includes at least one variable selected from the group consisting of: a number of data symbols to skip before or between implementations, FFT length, a number of the plurality of FFT stages to be executed, scaling for each FFT stage to be executed, a start time for each FFT operation to be executed, and a bit for instant start.

33. The computer program product of claim 29, wherein the operational data includes at least one of instructions for reading or supplying a sample start address, instructions for skipping a number of data symbols before or between implementations, instructions for executing multiple FFT stages, instructions for executing scaling at each FFT stage, instructions for starting an FFT operation, and instructions for performing an instant start.

34. The computer program product of claim 29, wherein the operations performed by the machine also include identifying beacons and their sub-channels.

35. The computer program product of claim 29, wherein the operations performed by the machine also include compensating for amplitude and phase distortions of filters.

36. The computer program product of claim 29, wherein the operations performed by the machine also include performing time offset correction using an output time offset received from the instruction processor.

37. The computer program product of claim 29, wherein the instruction processor comprises a digital signal processor that performs the operation of processing sequential instruction software commands, wherein a the Fourier transform engine comprises a hardware FFT engine, and wherein the operational data comprises information that indicates whether the Fourier transform engine should interrupt or not interrupt the digital signal processor when the Fourier transform engine has completed the operation of performing Fourier transforms.

* * * * *